Nov. 22, 1927.

G. H. HARRIS 1,650,350

DRIVING MECHANISM FOR HARVESTERS

Original Filed July 2, 1923   2 Sheets-Sheet 2

INVENTOR.
George H. Harris
BY
ATTORNEY

Patented Nov. 22, 1927.

1,650,350

UNITED STATES PATENT OFFICE.

GEORGE H. HARRIS, OF STOCKTON, CALIFORNIA.

DRIVING MECHANISM FOR HARVESTERS.

Application filed July 2, 1923, Serial No. 648,981. Renewed September 2, 1927.

This invention relates to improvements in side-hill harvester construction, and particularly to the mechanism used to drive and operate the swing-frame control means and the grain-threshing and header operating means. The swing-frames are arranged for independent vertical movement one on each side of the thresher proper, as for instance as shown in my Patent No. 1,542,126 dated June 16th, 1925, or in my copending application for patent, Serial No. 651,481, filed July 14th, 1923.

In all such harvesters as are now made, as far as I am aware, the drive from the power plant is transmitted first to the header drive and other harvester mechanism, and from there to the swing frame control means.

The main object of this invention therefore is to arrange the driving mechanism so that the swing frames can be operated without necessarily driving the other parts.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1:
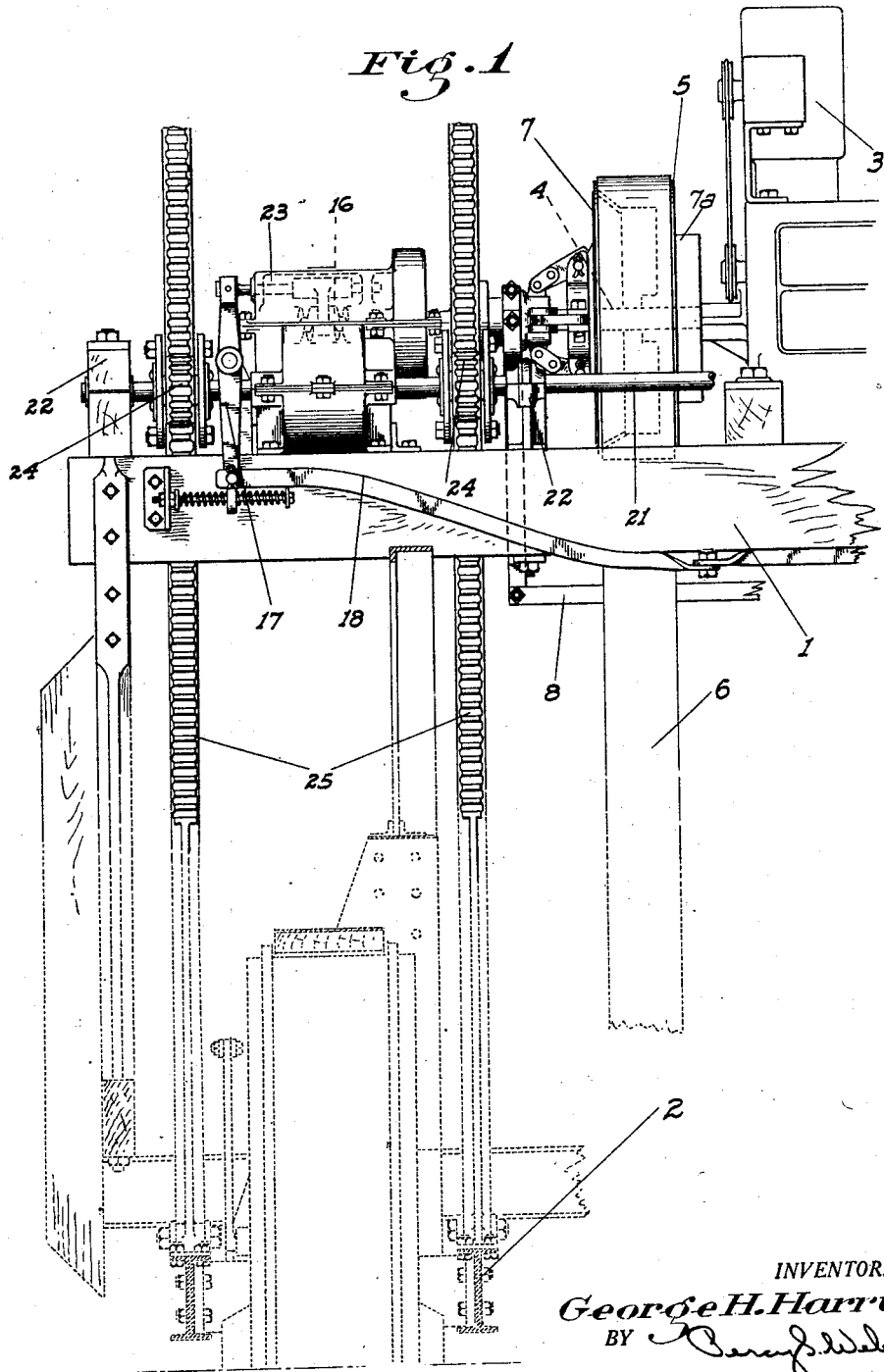
Fig. 1 is a side elevation of the driving mechanism, looking toward the front end of the harvester.
Figure 2:
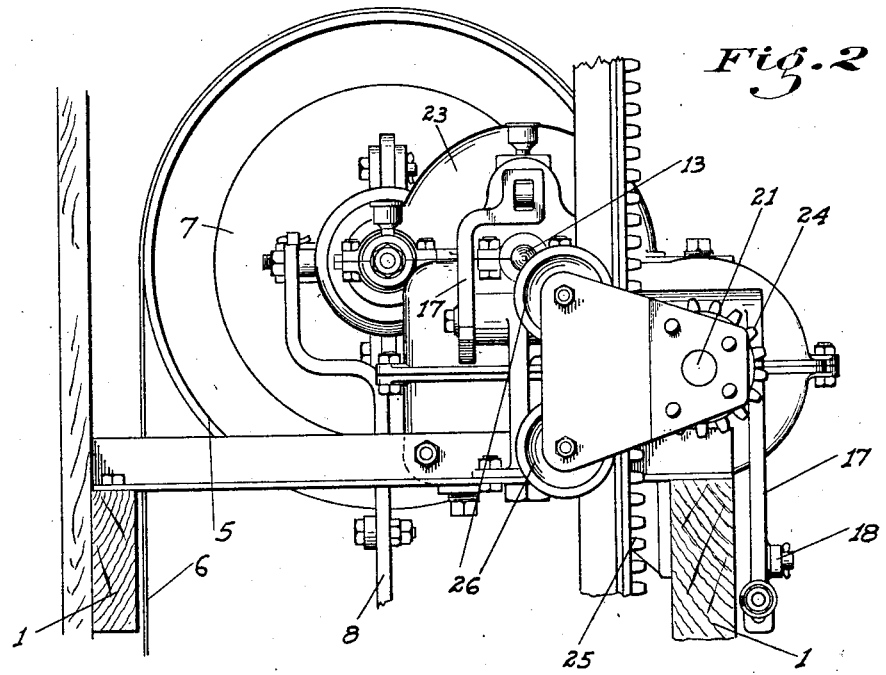
Fig. 2 is an end view of the mechanism.
Figures 3, 4:
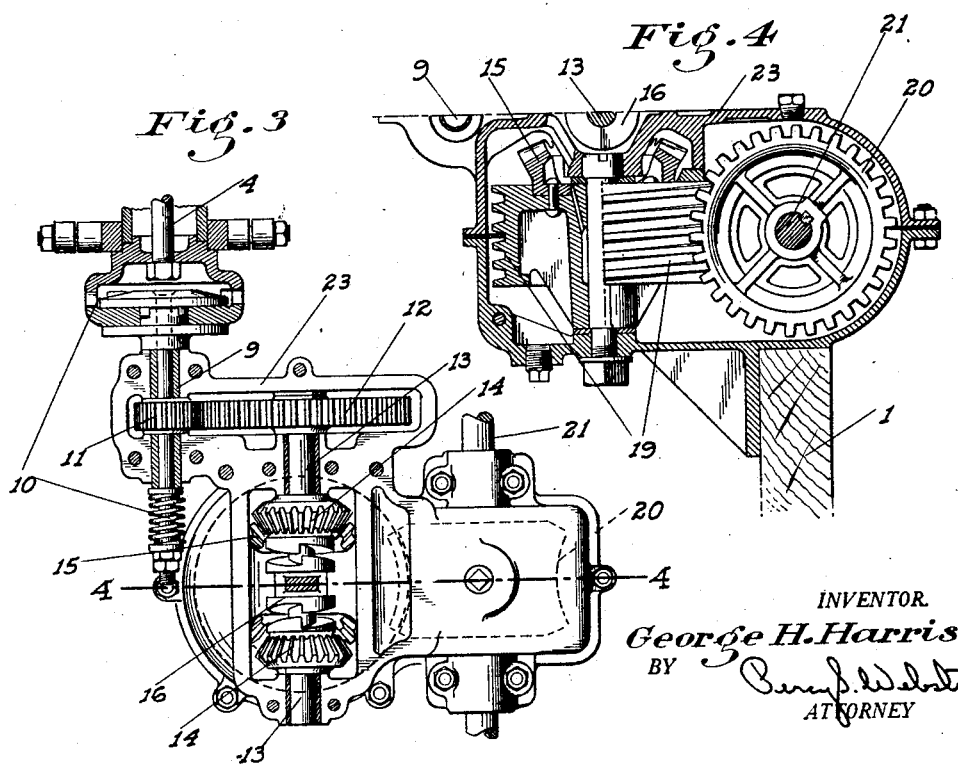
Fig. 3 is a top plan of the same, partly in section.
Fig. 4 is a cross section on the line 4—4 of Fig. 3.

Referring now more particularly to the characters of reference on the drawings, the numeral 1 denotes a portion of the upper transverse framework of the harvester, said framework projecting out over the usual wheel supported swing frames, one of which is outlined at 2.

Mounted on the frame 1 transversely of the harvester is the power plant 3, usually a gas engine, having a drive shaft 4.

On this shaft is loosely mounted a pulley 5 whose belt 6 drives the harvester mechanism (not shown).

The pulley is made as a clutch member to be gripped between plates 7 and 7ª of a clutch member keyed on the shaft, the clutch being controlled by lever means 8 leading to within reach of the operator of the harvester.

The main drive shaft 4 is in alinement with an auxiliary drive shaft 9 beyond the clutch 7, the shafts 4 and 9 being normally held in coupled relation by means of an automatic safety or slip-clutch structure 10 therebetween.

This safety clutch feature is commonly used, and forms no part of my invention.

Fixed on the shaft 9 is a pinion 11 meshing with a gear 12 on a countershaft 13 on which are loosely mounted two opposed bevel pinions 14 meshing with a bevel crown gear 15. A double clutch member 16 is splined on the shaft 13 between the pinions 14, being arranged to be moved into either one at a time by means of a control device 17 operated by a lever 18 extending to within reach of the operator of the harvester.

Fixed with the gear 15 is a very slow-pitch worm 19, engaging a worm wheel 20 whose shaft 21 extends practically the full length of the frame 1 and parallel thereto, and is supported and journaled at intervals thereon as at 22.

The shafts 9, 13 and 21 and the accompanying gearing and other parts above described constitute the "clock" mechanism, and are all journaled and mounted in an enclosed casing 23, which is mounted on the framework 1.

For each of the swing frames the shaft 21, outside the casing, has a pinion 24, engaging a vertical rack 25 projecting upwardly from and connected to the free end of the swing frame, the racks being held in engagement with the pinions by guide roller means 26.

The operation of the mechanism as a whole is the same as that of the mechanisms now employed for the purpose.

It will be noted however that if the clutch 7 is thrown out, the drive will be direct to the "clock" from the power plant, allowing the swing frames to be operated without the necessity of the harvester mechanism proper running at the same time, thereby accomplishing one of the most important objects of the invention.

Also, by the use of the slow pitch worm 19 for the clock mechanism, as specified, all possibility of the enormous rotative strain placed on the gear 20 by the racks 25 causing said worm to rotate and thereby cause undesired movement of the swing frames, is eliminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In a side-hill harvester having a swing frame on one side thereof arranged for vertical movement and a power plant which includes a drive shaft, a raising and lowering control mechanism for the swing frame which includes a shaft alined with the power plant shaft, a direct driving connection between the adjacent ends of said shafts, a drive member on the power plant shaft, and a clutch connection between said member and power plant shaft.

In testimony whereof I affix my signature.

GEORGE H. HARRIS.